US011955735B2

(12) United States Patent
Guo et al.

(10) Patent No.: US 11,955,735 B2
(45) Date of Patent: Apr. 9, 2024

(54) FOUR-NOTCH FLEXIBLE WEARABLE ULTRA-WIDEBAND ANTENNA FED BY COPLANAR WAVEGUIDE

(71) Applicant: ANHUI UNIVERSITY, Anhui (CN)

(72) Inventors: Xiaohui Guo, Anhui (CN); Pengbin Gui, Anhui (CN); Siliang Wang, Anhui (CN); Liangpan Yang, Anhui (CN); Zhiliang Chen, Anhui (CN); Wei Zeng, Anhui (CN); Lixia Yang, Anhui (CN); Yaohua Xu, Anhui (CN); Zhixiang Haung, Anhui (CN)

(73) Assignee: ANHUI UNIVERSITY, Anhui (CN)

( * ) Notice: Subject to any disclaimer, the term of this patent is extended or adjusted under 35 U.S.C. 154(b) by 158 days.

(21) Appl. No.: 17/784,670

(22) PCT Filed: Dec. 31, 2021

(86) PCT No.: PCT/CN2021/144025
§ 371 (c)(1),
(2) Date: Jun. 13, 2022

(87) PCT Pub. No.: WO2022/233149
PCT Pub. Date: Nov. 10, 2022

(65) Prior Publication Data

US 2024/0030609 A1 Jan. 25, 2024

(30) Foreign Application Priority Data

May 6, 2021 (CN) ........................ 202110491726.X

(51) Int. Cl.
*H01Q 9/04* (2006.01)
*H01Q 1/27* (2006.01)
(Continued)

(52) U.S. Cl.
CPC ............. *H01Q 9/045* (2013.01); *H01Q 1/273* (2013.01); *H01Q 1/48* (2013.01); *H01Q 5/25* (2015.01); *H01Q 9/40* (2013.01)

(58) Field of Classification Search
CPC ............. H01Q 5/25; H01Q 9/045; H01Q 9/40
See application file for complete search history.

(56) References Cited

U.S. PATENT DOCUMENTS 7,342,553 B2 * 3/2008 Soler Castany ....... H01Q 5/371 343/702
7,646,341 B1 * 1/2010 Lin .......................... H01Q 9/40 343/700 MS
(Continued)

FOREIGN PATENT DOCUMENTS

CN 105932409 A * 9/2016 ............... H01Q 1/38
CN 106025531 A * 10/2016 ............... H01Q 1/38
(Continued)

OTHER PUBLICATIONS

"International Search Report (Form PCT/ISA/210) of PCT/CN2021/144025," dated Mar. 2, 2022, pp. 1-4.
(Continued)

*Primary Examiner* — Ab Salam Alkassim, Jr.
(74) *Attorney, Agent, or Firm* — JCIPRNET

(57) ABSTRACT

A four-notch flexible wearable ultra-wideband antenna fed by coplanar waveguide, includes a flexible base. A ground plane, a radiation patch and a feeder are arranged on the flexible base. There are several resonant tanks on the feeder and the radiation patch. The flexible base is made of insulating flexible material, and the feeder, the radiation patch and the ground plane are made of conductive flexible material. The four-notch flexible wearable ultra-wideband antenna fed by coplanar waveguide of the present application can be prepared by layer-by-layer assembly technology, spray printing or printed circuit board technology, and has
(Continued)

the advantages of miniaturization and low profile, compact structure, convenient production, good conformality, wearable and other advantages.

4 Claims, 18 Drawing Sheets

(51) Int. Cl.
*H01Q 1/48* (2006.01)
*H01Q 5/25* (2015.01)
*H01Q 9/40* (2006.01)

(56) References Cited

U.S. PATENT DOCUMENTS

| | | | | |
|---|---|---|---|---|
| 8,004,467 | B2 * | 8/2011 | Yanagi | H01Q 9/285 343/846 |
| 2005/0078042 | A1 * | 4/2005 | Chua | H01Q 9/0407 343/746 |
| 2005/0110686 | A1 * | 5/2005 | Frederik du Toit | H01Q 19/005 343/770 |
| 2005/0179598 | A1 | 8/2005 | Legay et al. | |
| 2005/0280580 | A1 * | 12/2005 | Lin | H01Q 1/38 343/846 |
| 2006/0066487 | A1 * | 3/2006 | Park | H01Q 1/38 343/700 MS |
| 2006/0103577 | A1 * | 5/2006 | Lee | H01Q 9/40 343/700 MS |
| 2007/0247386 | A1 * | 10/2007 | Lee | H01Q 9/30 343/770 |
| 2009/0009399 | A1 | 1/2009 | Gaucher et al. | |
| 2009/0295473 | A1 | 12/2009 | Dupuy et al. | |
| 2012/0154231 | A1 * | 6/2012 | Puente Baliarda | H01Q 9/40 343/752 |
| 2013/0187816 | A1 * | 7/2013 | Chung | H01Q 9/40 343/722 |
| 2017/0194720 | A1 * | 7/2017 | Duan | H01Q 15/0086 |
| 2021/0066809 | A1 * | 3/2021 | Flores-Cuadras | H01Q 1/38 |
| 2023/0130741 | A1 * | 4/2023 | Itami | H01Q 9/045 343/702 |
| 2023/0216194 | A1 * | 7/2023 | Kanagasabai | H01Q 5/378 343/725 |
| 2023/0223697 | A1 * | 7/2023 | Carper | H01Q 13/085 343/700 MS |

FOREIGN PATENT DOCUMENTS

| | | | | | |
|---|---|---|---|---|---|
| CN | 106935967 | A | * | 7/2017 | H01Q 1/38 |
| CN | 108767460 | A | * | 11/2018 | H01Q 1/38 |
| CN | 109560378 | A | * | 4/2019 | H01Q 1/38 |
| CN | 109672020 | | | 4/2019 | |
| CN | 110994163 | | | 4/2020 | |
| CN | 111082225 | A | * | 4/2020 | H01Q 1/38 |
| CN | 111224238 | | | 6/2020 | |
| CN | 111293433 | A | * | 6/2020 | |
| CN | 113206377 | | | 8/2021 | |

OTHER PUBLICATIONS

Boning Wang, "Design and Analysis of A Wearable Miniaturized Antenna for UWB Application," Master's thesis, Jun. 2020, Department of Electronic Science and Engineering, Chengdu: University of Electronic Science and Technology of China.
Xu Decheng, "Research and Implementation of Flexible Antenna for Wearable Wireless Communication System," Doctor's thesis, May 2017, Department of Electronic Science & Engineering, Jilin University.
Ran Fang et al., "Compact and Low-Profile UWB Antenna Based on Graphene-Assembled Films forWearable Applications," Sensors, Apr. 2020, pp. 1-10.
Soufian Lakrit et al., "Compact UWB flexible elliptical CPW-fed antenna with triple notch bands for wireless communications," International Journal of RF and Microwave Computer-Aided Engineering, Feb. 2020, pp. 1-14.
Aruna Veeraselvam et al., "Polarization diversity enabled flexible directional UWB monopole antenna for WBAN communications," International Journal of RF and Microwave Computer-Aided Engineering, May 2020, pp. 1-12.
MD. Rabiul Hasan et al., "Compact CPW-fed circular patch flexible antenna for super-wideband applications," IET Microwaves, Antennas & Propagation, Apr. 2020, pp. 1069-1073.

* cited by examiner

FOUR-NOTCH FLEXIBLE WEARABLE ULTRA-WIDEBAND ANTENNA FED BY COPLANAR WAVEGUIDE

CROSS-REFERENCE TO RELATED APPLICATION

This application is a 371 of international application of PCT application serial no. PCT/CN2021/144025, filed on Dec. 31, 2021, which claims the priority benefit of China application no. 202110491726.X, filed on May 6, 2021. The entirety of each of the above mentioned patent applications is hereby incorporated by reference herein and made a part of this specification.

TECHNICAL FIELD

The application relates to the field of wearable antenna field, and in particular to a four-notch flexible wearable ultra-wideband antenna fed by coplanar waveguide.

BACKGROUND ART

Antennas are devices that transmit and receive electromagnetic waves and play an important role in wireless communication systems. Since the invention of the antenna by Hertz and Marconi, it has been widely used in various fields of human production and life. With the exploration and research of antennas by scientific researchers, various types and characteristics of antennas have been put into different application scenarios. With the rapid development of wireless communication technology, the wireless body area network centered on the human body has become a research hotspot, and the wireless body area network plays an important role in sports, entertainment and leisure, military, medical and other fields.

Among the existing short-range wireless communication technologies, ultra wideband (UWB) technology has attracted widespread attention due to its advantages of low power consumption, high speed, and strong anti-interference ability. The advantages of UWB technology can well meet the requirements of miniaturization and high efficiency of wireless body area network. In order to improve the communication quality, it is of great significance to research and design a wearable ultra-wideband antenna. At the same time, in order to avoid interference with the existing wireless communication system, the antenna should also have a multi-notch function.

The wearable antenna needs to be attached to the surface of the wearable device or the human body to meet the needs of wireless communication. Therefore, it needs to have the characteristics of flexibility, which is convenient to conform to the human body or the device and needs to ensure the safety of radiation to the human body. The earliest wearable antenna is the whip antenna used in the military. Although it can improve the combat capability of individual soldiers, it does not have concealment. With the development of the antenna feeding method and the preparation process, the antenna with miniaturized and low profile characteristics can be easily obtained. Among them, planar printed antennas fed by microstrip lines and coplanar waveguides are favored for their advantages of convenient preparation, light weight, and miniaturization. Adding a band-stop filter in a wireless communication system can realize the antenna notch function, that is, the antenna has a stop-band characteristic in a specific frequency band, thereby avoiding mutual interference with other wireless communication systems. But it undoubtedly makes the system very complicated. However, the method of realizing the wave trap function by printing grooves on the plane has little effect.

At present, the main problem of domestic research on wearable ultra-wideband antennas is that the design of ultra-wideband antennas mainly uses FR4 (glass fiber epoxy resin board) and RT5880 microwave dielectric boards as the base materials. Such antennas have poor flexibility and are not wearable. And wearable antennas are mostly single-frequency or dual-frequency antennas, and there are few researches on wearable ultra-wideband antennas. Wang Boning realized a flexible monopole antenna by cladding copper on the FPC-1 substrate (Wang Boning. Research and Design of Wearable Miniaturized Time Domain Ultra-Wideband Antenna [D]. Chengdu: University of Electronic Science and Technology of China, 2020.), which has good performance in the ultra-wideband frequency band and realizes the double notch function. But it is not verified whether the Specific Absorption Rate (SAR) meets the requirements. Xu Decheng designed a flexible wearable fabric antenna based on fabric as the substrate and by filling with polydimethylsiloxane (PDMS) with graphene and polyaniline to prepare conductive patches and ground planes, which only works at 2.45 GHz (Xu Decheng. Research on the Design and Implementation of Flexible Antennas for Wearable Wireless Communication Systems [D]. Changchun: Jilin University, 2017.). Professor He Daping's research group used graphene assembly film as conductive material to photolithography on flexible substrate, and obtained a flexible ultra-wideband antenna with superior bending performance, but the preparation process is relatively complicated (Fang R, Song R, Zhao X, et al. Compact and Low-Profile UWB Antenna Based on Graphene-Assembled Films for Wearable Applications[J]. Sensors, 2020, 20(9):2552.).

At present, foreign research on wearable ultra-wideband antennas tends to achieve ultra-wideband characteristics and notch characteristics of antennas, and the mainstream substrate uses FR4 substrate. The flexible ultra-wideband antenna substrate is made of polytetrafluoroethylene (Teflon), polyimide (PI), polyethylene terephthalate (PET), PDMS, etc. The conductive material is mostly copper. The antenna is fabricated by using FPCB technology on the surface of the flexible substrate. Lakrit S et al. designed a three-notch flexible ultra-wideband antenna printed with copper on PTFE, but the antenna radiation has poor omnidirectionality (Lakrit S, Das S, Ghosh S, et al. Compact UWB flexible elliptical CPW-fed antenna with triple notch bands for wireless communications[J]. International Journal of RF and Microwave Computer-Aided Engineering, 2020, 30(7): 22201.). Veeraselvam A et al. prepared a coplanar waveguide-fed flexible monopole antenna using Rogers' RO4003C flexible dielectric substrate as the base and the method of photolithographic radiation patch, and verified its wearability, but the antenna does not have the wave trap function, and the metal reflector is loaded to make the antenna profile higher (Veeraselvam A, Mohammed G N A, Savarimuthu K, et al. Polarization diversity enabled flexible directional UWB monopole antenna for WBAN communications[J]. International Journal of RF and Microwave Computer-Aided Engineering, 2020, 30(9): 22311.). Hasan M R et al. prepared a flexible ultra-wideband antenna by the method of spraying conductive silver particles on a PET substrate using a DMP-2831 inkjet printer, but did not design a notch structure and the wearability of the antenna has not been verified (Hasan M R, Riheen M A, Sekhar P, et al. Compact CPW Fed Circular Patch Flexible Antenna for Super Wideband Applications[J]. IET Microwaves, Antennas & Propagation, 2020, 14(10): 1069-1073.).

Compared with the microstrip line, the coplanar waveguide not only has the characteristics of low profile, miniaturization, and easy integration with microwave systems, but also has better dispersion characteristics and lower loss. At the same time, since the ground plane and the radiation patch are on the same side, its preparation is easier. Therefore, coplanar waveguide feeding is more suitable for ultra-wideband antenna design and has been widely adopted in recent years. Considering that the antenna is likely to interfere with nearby electromagnetic wave signals during actual operation, the ultra-wideband antenna needs to have a notch function. Designing a notch structure directly on the antenna can greatly reduce the complexity of the wireless communication system. ISM band (2.45 GHz), WIMAX band (3.3-3.8 GHz), WLAN band (5.3-5.8 GHz), X downstream band (7.25-7.75 GHz), X upstream band (7.9-8.4 GHz) are hot spots for notch design.

Although traditional copper foil has good conductivity, its flexibility is not outstanding. The silicone conductive silver glue and curing agent, which are uniformly stirred in a certain proportion, have the characteristics of good film formation, strong adhesion, good flexibility and high conductivity after curing at room temperature or low temperature. This provides a new idea for the selection of conductive materials. With the gradual maturity of metal nanoparticle preparation technology, the preparation of metal nanoparticles into conductive "ink" and the use of printer inkjet printing has become a research hotspot in the field of flexible electronics. The DMP-2831 material jet printer launched by Fujifilm Dimatix uses MEMS and silicon materials to make ink jet heads, which can support jet printing of various materials (such as silver ink, transparent conductive materials, etc.), providing new opportunities for printing flexible wearable electronic products. Compared with traditional photolithography and engraving methods, it is not only simple in process but also environmentally friendly.

SUMMARY OF THE APPLICATION

The purpose of this application is to provide a four-notch flexible wearable ultra-wideband antenna fed by coplanar waveguide.

To achieve the above purpose, the application provides the following technical solutions:

A four-notch flexible wearable ultra-wideband antenna fed by coplanar waveguide, includes: a flexible base. The lower part of the upper surface of the flexible base is covered with a ground plane, and the upper part of the upper surface of the flexible base is covered with a radiation patch. A feeder slot is opened in the middle of the ground plane. The feeder includes a main feeder located in the middle and two branch feeders formed by branching to both sides of the main feeder at the branch point located in the upper part of the main feeder. The feeder is attached to the upper surface of the flexible base. The lower and middle parts of the main feeder are usually located in the feeder slot, and there is a gap between each side of which and the ground plane, and the upper part of the main feeder protrudes out of the feeder slot.

The top of the main feeder is connected to the bottom of the radiation patch as a whole. The tops of the two branch feeders are connected to the radiation patch as a whole through the feeder connection provided on both sides of the bottom of the radiation patch. The vertical length of the main feeder from the branch point to the top is equal to the vertical length of the branch feeder. There is a notch on the top of the ground plane, which corresponds to the position and shape of the branch feeder.

There are several resonant tanks on the feeder and the radiation patch, and the number of the resonant tanks corresponds to the number of stop-band characteristics that the antenna needs to achieve. The flexible base is made of insulating flexible material, and the feeder, the radiation patch and the ground plane are made of conductive flexible material.

Wherein, the radiation patch is hexagonal, and a triangular patch opening is opened downward at the horizontally arranged top edge position of the hexagon. The feeder connection is correspondingly set as a right triangle.

Wherein, the branch feeder is L-shaped, and the resonant tank is right-angled U-shaped or annular with an opening.

Wherein, the flexible base, the feeder and the ground plane are in a symmetrical structure.

Wherein, the flexible base is made of PDMS, PET or PI, and the feeder, the radiation patch and the ground plane are made of conductive silver glue, conductive silver particles or copper foil.

Aiming at the problems of low flexibility and poor wearability of existing ultra-wideband antennas, as well as wearable antennas operating in narrowband and complex fabrication processes, the invention combines flexible electronic technology and ultra-wideband technology to propose a flexible wearable ultra-wideband antenna structure using coplanar waveguide feeding and impedance bandwidth coverage 3-14 GHz. The antenna structure has stop-band characteristics around the four bands of 3.3-3.6 GHz, 5.4-5.8 GHz, 7.3-7.7 GHz, and 7.9-9.1 GHz.

Compared with the traditional inflexible base UWB antenna, the four-notch flexible wearable ultra-wideband antenna fed by coplanar waveguide of the present application uses flexible PDMS, PET or PI as the material of the base, and uses conductive silver glue, conductive silver particles or copper foil to prepare the radiation patch, the feeder, and the ground plane. The antenna is fully flexible as a whole, and has the advantages of light weight, good conformality, high softness, and strong wearability.

The flexible wearable ultra-wideband antenna of the present application can be processed by a layer-by-layer assembly process, an inkjet printing process or a flexible printed circuit board process. The layer-by-layer assembly process is to use 3D printing technology to prepare the PDMS base, use conductive silver glue to prepare the radiation patch, the feeder, and the ground plane, and then assemble the antenna structure. The inkjet printing process is to use the inkjet printing process to directly print the antenna pattern on the PET base. The FPCB process is to print a copper antenna structure on a PI film. All three methods have the advantages of simple preparation process, low cost and industrialization.

Compared with the wearable narrow-band antenna, the present application uses a compact structure to achieve an ultra-wideband impedance bandwidth with good directivity in the bandwidth, and uses a method of slotting to generate four-band notches, and the SAR value meets the safety requirements when transmitting UWB signals. It has the characteristics of miniaturization and low profile, which can meet the wireless communication requirements of body area network.

Figure 1:
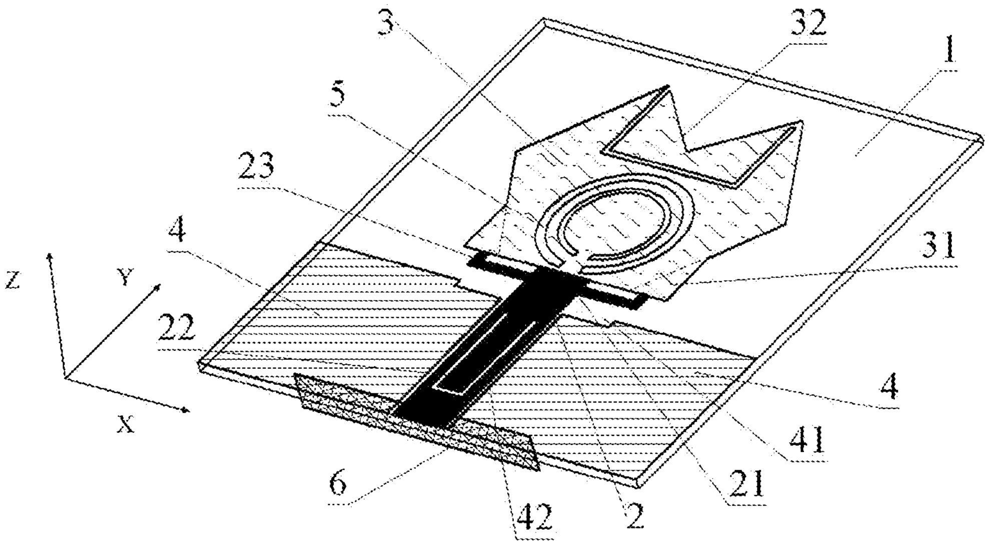
FIG. 1 is a schematic view of the structure of a four-notch flexible wearable ultra-wideband antenna fed by coplanar waveguide of the application.

Labels in the figure: 1. flexible base; 2. feeder; 21. branch point; 22. main feeder; 23. branch feeder; 3. radiation patch; 31. feeder connection; 32. patch opening; 4. ground plane; 41. notch; 42. feeder slot; 5. resonant tank; 6. wave port feeding surface; 7. skin model; 8. fat model; 9. muscle model.

DETAILED DESCRIPTION OF THE EMBODIMENTS

In order to make the technical solutions and advantages of the embodiments of the present application clearer, the following will describe the technical solutions in the embodiments of the present application more clearly and completely with reference to the drawings in the embodiments of the present application. Obviously, the described embodiments are a part of the embodiments of the present application, rather than all the embodiments. Based on the embodiments of the present application, all other embodiments obtained by a person of ordinary skill in the art without creative work shall fall within the protection scope of the present application.

In the four-notch flexible wearable ultra-wideband antenna fed by coplanar waveguide in an embodiment of the present application, the upper surface of the flexible base 1 is provided with a feeder 2, a radiation patch 3 and a ground plane 4. The feeder 2, the radiation patch 3 and the ground plane 4 are made of conductive silver glue, and the flexible base 1 is made of PDMS.

The following requirements are put forward for the antenna performance parameters of this embodiment: The impedance bandwidth should meet at least 3.1-10.6 GHz, that is, S11←10 dB or VSWR<2 in the frequency band, and the antenna has stop-band characteristics in the vicinity of WIMAX band, WLAN band, X downlink band, and ITU band (7.9-8.7 GHz). This embodiment takes the S11 curve as the standard. The antenna is flexible and can work under a certain degree of bending. When the antenna transmits UWB signal, the SAR value can meet the safety radiation standard. In view of the above requirements, the following antenna structures are proposed:

As shown in FIG. 1, a four-notch flexible wearable ultra-wideband antenna fed by coplanar waveguide, includes: a flexible base.

The lower part of the upper surface of the flexible base 1 is covered with a ground plane 4, and the upper part of the upper surface of the flexible base 1 is covered with a radiation patch 3. A feeder slot 42 is opened in the middle of the ground plane. The feeder 2 includes a main feeder 22 located in the middle and two branch feeders 23 formed by branching to both sides of the main feeder 22 at the branch point 21 located in the upper part of the main feeder 22. The feeder 2 is attached to the upper surface of the flexible base 1. The lower and middle parts of the main feeder 22 are usually located in the feeder slot 42, and there is a gap between each side of which and the ground plane 4, and the upper part of the main feeder 22 protrudes out of the feeder slot 42. The top of the main feeder 22 is connected to the bottom of the radiation patch 3 as a whole. The tops of the two branch feeders 23 are connected to the radiation patch 3 as a whole through the feeder connection 31 provided on both sides of the bottom of the radiation patch 3. The vertical length of the main feeder 22 from the branch point 21 to the top is equal to the vertical length of the branch feeder 23.

In the specific embodiment, the radiation pattern of the antenna will be distorted due to the excessive size of the radiation patch 3. Therefore, the radiation patch 3 needs to be set to a smaller size. The function of the feeder connection 31 is to widen the bottom width of the radiation patch 3 when the width of the bottom of the radiation patch 3 is insufficient, so as to ensure that the vertical length of the main feeder 22 from the branch point 21 to the top is equal to the vertical length of the branch feeder 23. On the premise of not affecting the direction of the antenna, the vertical current is increased to reduce the return loss of the antenna at high frequencies.

There is a notch 41 on the top of the ground plane 4, which corresponds to the position and shape of the branch feeder 23, to improve the impedance matching characteristics of the antenna.

There are several resonant tanks 5 on the feeder 2 and the radiation patch 3, and the number of the resonant tanks 5 corresponds to the number of stop-band characteristics that the antenna needs to achieve. The design of the resonant tank 5 has two forms, one is that an insulating material such as air is isolated between the two ends of the resonant tank 5, and the other one is that the two ends of the resonant tank 5 are connected by a conductive material. The total length of the latter resonant tank 5 should be set to be twice that of the former resonant tank 5. In addition, when there are multiple resonant tanks 5, it should be noted that sufficient spacing is reserved between the resonant tanks 5 to ensure that strong coupling does not occur between the resonant tanks 5.

In the specific embodiment, the radiation patch 3 is hexagonal, and a triangular patch opening 32 is opened downward at the horizontally arranged top edge position of the hexagon. On the premise of ensuring the working performance of the antenna, the amount of materials is reduced, which is beneficial to the control of the production cost of the antenna. The feeder connection 31 is correspondingly set as a right triangle.

The branch feeder 23 is L-shaped, and the resonant tank 5 is right-angled U-shaped or annular with an opening. Setting the resonant tank 5 in a U shape or a ring shape with an opening can make the overall structure of the antenna more compact while ensuring that the total length of the resonant tank 5 meets the design requirements.

In the specific embodiment, the flexible base 1, the feeder and the ground plane are in a symmetrical structure, so that the antenna can maintain the most stable working performance in a bent state.

The flexible wearable ultra-wideband antenna of this embodiment is modeled and simulated by means of the three-dimensional electromagnetic simulation software Ansoft HFSS. The wave port configuration of the coplanar waveband excitation in this embodiment is shown in FIG. 1. The wave port feeding surface 6 has a planar structure and is connected to the feeder 2 and the ground plane 4.

Figure 2A:
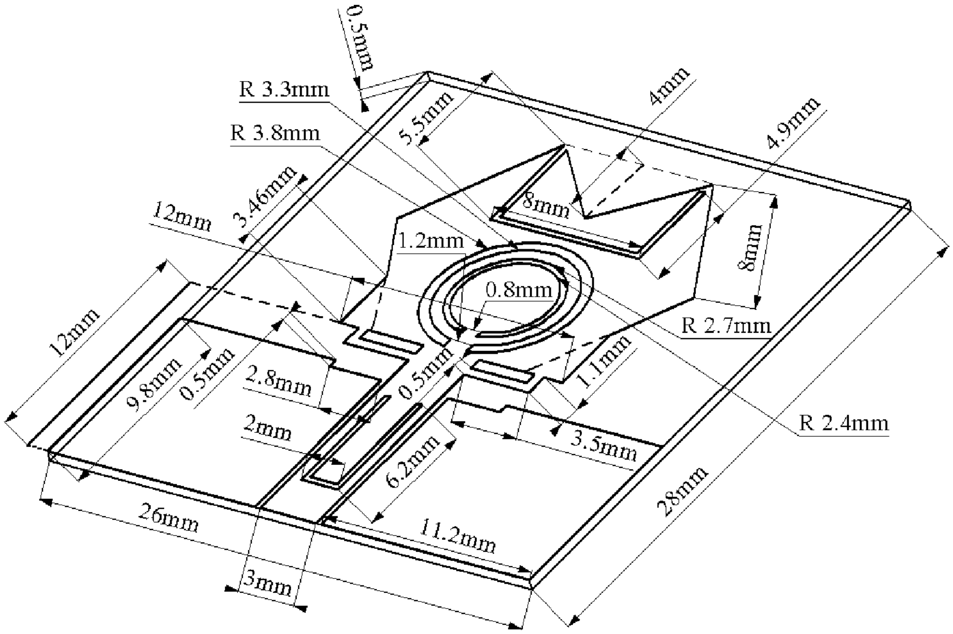
FIG. 2A is a parameter diagram of the size of the antenna of the present application with PDMS as the base and conductive silver paste as the conductive medium.

After completing the modeling and wave port excitation settings of the four-notch flexible wearable belt antenna fed by the coplanar waveguide in this embodiment, the frequency sweep analysis is performed on the antenna size parameters. The optimized antenna size is shown in FIG. 2A:

A Cartesian coordinate system is established with the vertical direction as the Y direction, so that the flexible base 1 is located in the XOY plane, and the z direction is perpendicular to the upper surface of the flexible base 1. Then, The Y-direction length of the flexible base 1 is 28 mm, the X-direction length is 26 mm, and the z-direction thickness is 0.5 mm.

The Y-direction length of the main feeder 22 is 12 mm and the X-direction length is 3 mm. The Y-direction length of the branch point 21 from the top of the main feeder is 1.1 mm. The branch feeder 23 is L-shaped, the Y-direction length of the branch feeder 23 is 1.1 mm, the X-direction length is 3 mm, and the width of the branch feeder 23 is 0.5 mm.

The radiation patch 3 is a regular hexagon with a side length of 8 mm. The patch opening 32 is in the shape of an isosceles triangle, the bottom side of which coincides with the top side of the regular hexagon, the height is along the Y direction, and the length is 4 mm. The feeder connection 31 is in the form of a right-angled triangle, and its two right-angled sides are arranged along the Y and X directions respectively, and the lengths are 3.46 mm and 2 mm respectively. The bottoms of the two feeder connections 31 are flush with the bottom side of the regular hexagon, and the hypotenuses of the two feeder connections 31 are respectively set to fit the two sides of the lower part of the regular hexagon.

The ground plane 4 on one side of the feeder 2 has a Y-direction length of 9.8 mm and an X-direction length of 11.2 mm. The X-direction length of the gap between the main feeder 22 and the ground plane 4 is 0.3 mm. The length of the notch 41 is 0.5 mm in the Y direction and 2.8 mm in the X direction.

There are four resonance slots 5 in this embodiment, so the antenna of this embodiment can correspondingly realize four stop-band characteristics. The specific arrangement of the four resonant slots 5 is as follow.

The first resonant tank 5 is arranged on the main feeder 22, in a right-angled U-shape, with an opening at the top. Its Y-direction length is 6.2 mm, its X-direction length is 2 mm, and the tank width is 0.3 mm.

The second and third resonance tanks 5 are located in the middle of the radiation patch 3, and are in the form of two concentric rings with openings, and the openings of the two rings are located on the same side. Wherein, the larger resonance tank 5 has an outer diameter of 3.8 mm, an inner diameter of 3.3 mm, and an opening length of 1.2 mm, and the smaller resonance tank 5 has an outer diameter of 2.7 mm, an inner diameter of 2.4 mm, and an opening length of 0.8 mm.

The fourth resonant tank 5 is located on the top of the radiating patch 3, in a right-angled U shape, and the opening is located at the top. One of the top ends on both sides is in communication with the air, and the other is not in communication with the air. The Y-direction length of the fourth resonance tank 5 of the side in communication with the air is 5.5 mm, the Y-direction length of the side not in communication with the air is 4.9 mm, the X-direction length is 8 mm, and the tank width is 0.3 mm.

Figure 3A:
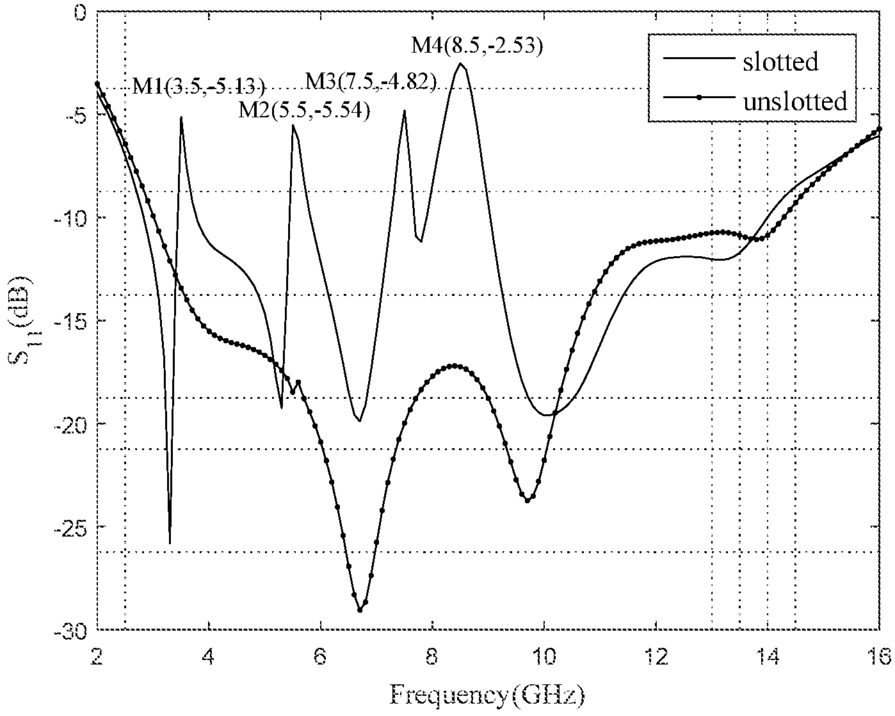
FIG. 3A is the S11 curves of the antenna of the present application with PDMS as the base and conductive silver glue as the conductive medium when it is unslotted and slotted.
Figure 4A:
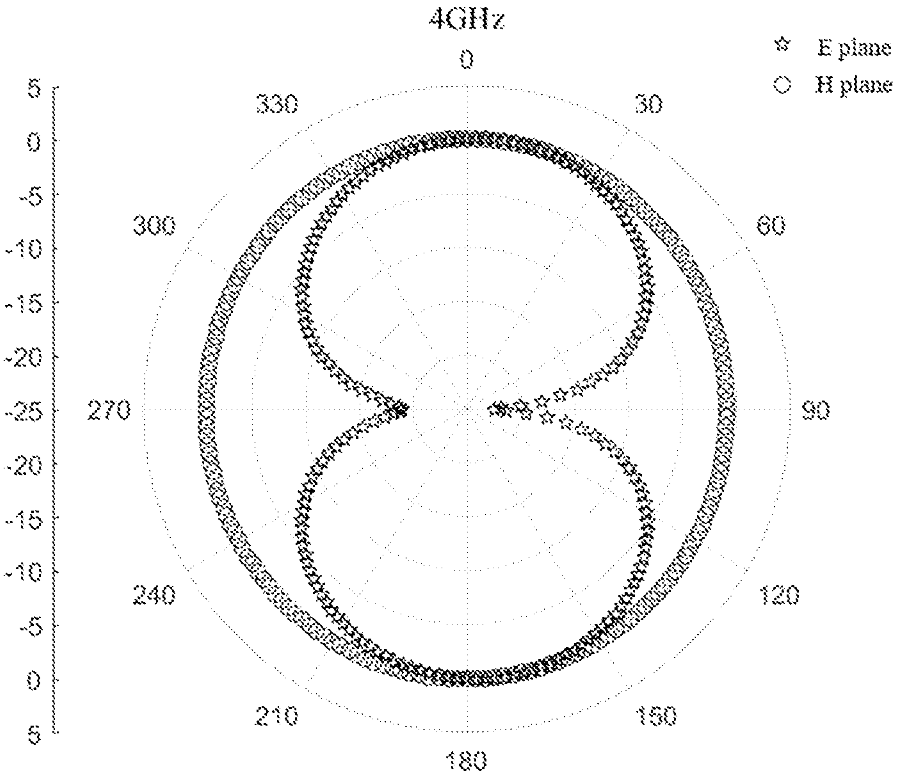
FIG. 4A, FIG. 5A, and FIG. 6A are the patterns of the E and H planes at 4 GHz, 7 GHz, and 10 GHz of the antenna of this application respectively, which uses PDMS as the base and conductive silver glue as the conductive medium.
Figure 5A:
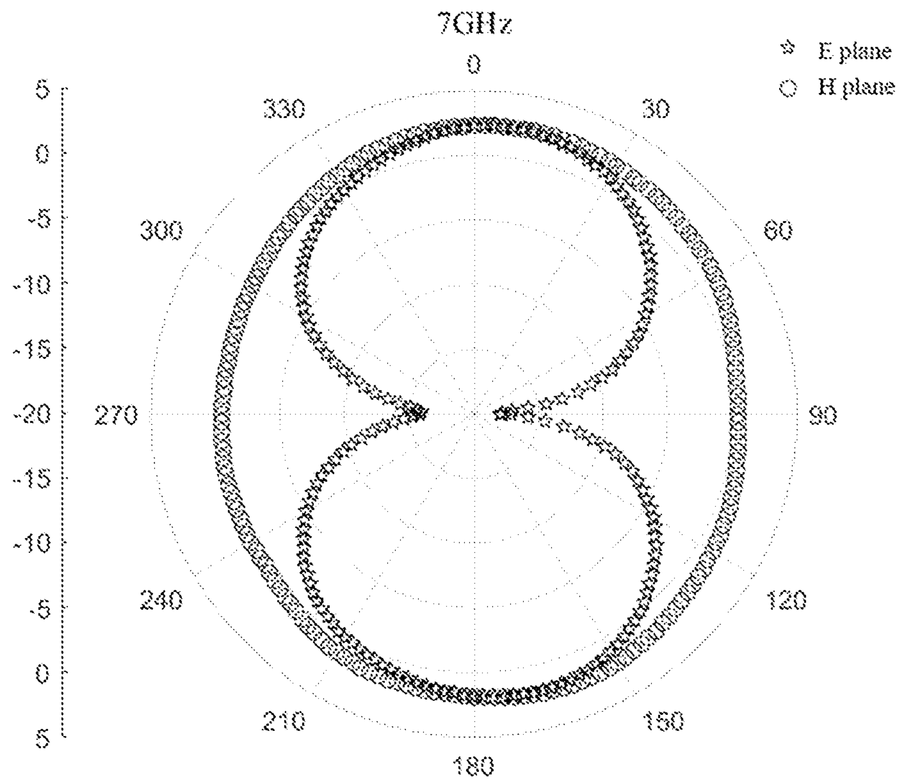
Figure 6A:
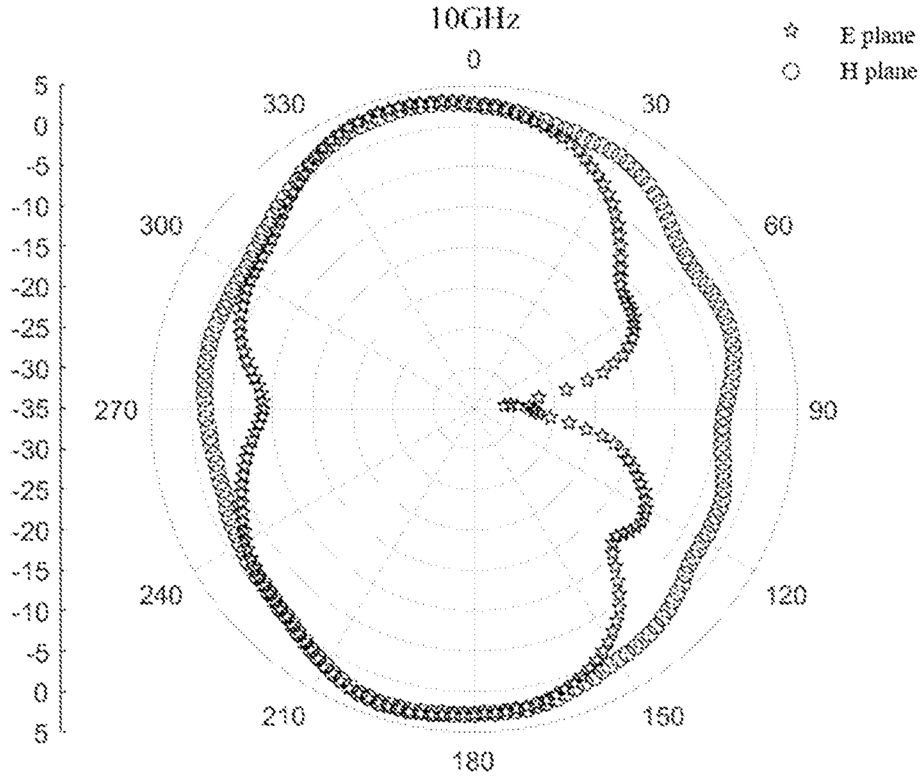
Figure 7:
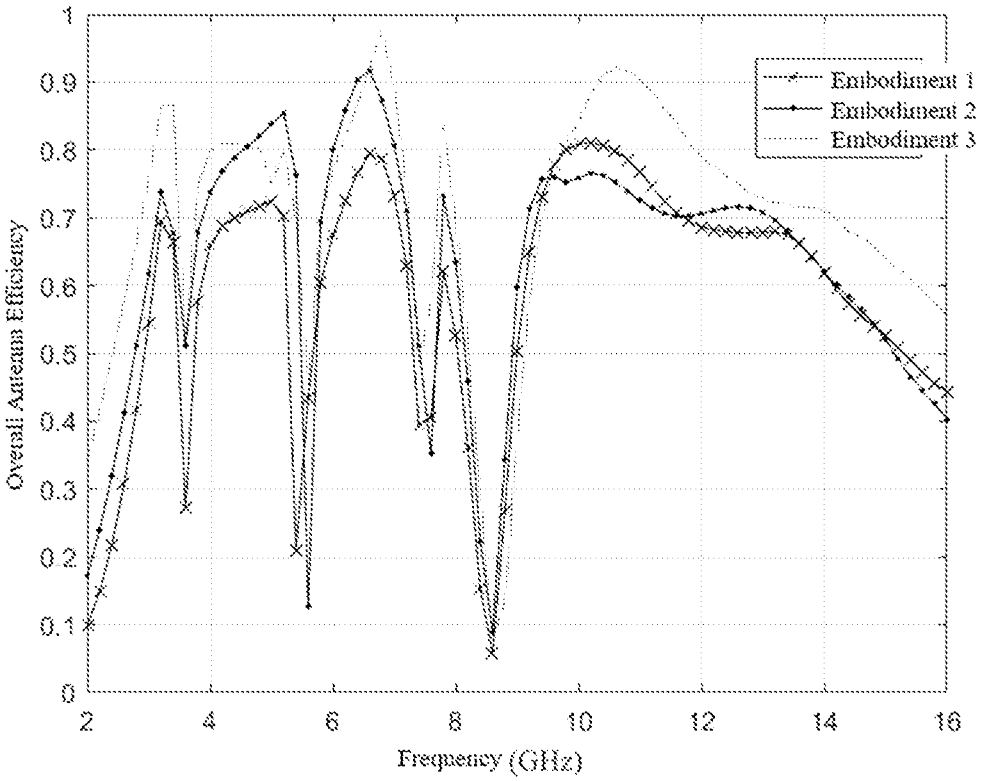
FIG. 7 is an antenna efficiency curve of three embodiments of a four-notch flexible wearable ultra-wideband antenna fed by coplanar waveguide of the present application.

The optimized model is simulated, including slotted and unslotted cases, and its S11 curve is obtained as shown in FIG. 3A. It can be seen from the figure that the S11 parameters of the unslotted UWB antenna are all less than −10 dB at 3-14.3 GHz, the absolute impedance bandwidth of the antenna covers the UWB frequency band, and the relative impedance bandwidth reaches 131%. The slotted antenna has stop-band characteristics at 3.4-3.8 GHz, 5.4-5.8 GHz, 7.3-7.7 GHz, and 7.9-9.1 GHz, and realizes the four-notch function. The stop-band resonance points are marked with M1, M2, M3, and M4, respectively. FIG. 4A, FIG. 5A, and FIG. 6A are the gain patterns of the E-plane and H-plane at 4 GHz, 7 GHz, and 10 GHz of this embodiment, respectively. It can be seen from the figure that the H-plane of this embodiment can maintain good omnidirectional radiation in the ultra-wideband frequency band, so it can be practically applied. FIG. 7 is the antenna efficiency curve of three embodiments of the present application. It can be seen from the figure that the antenna efficiency of this embodiment is basically above 70%, and the performance is good.

Figure 8:
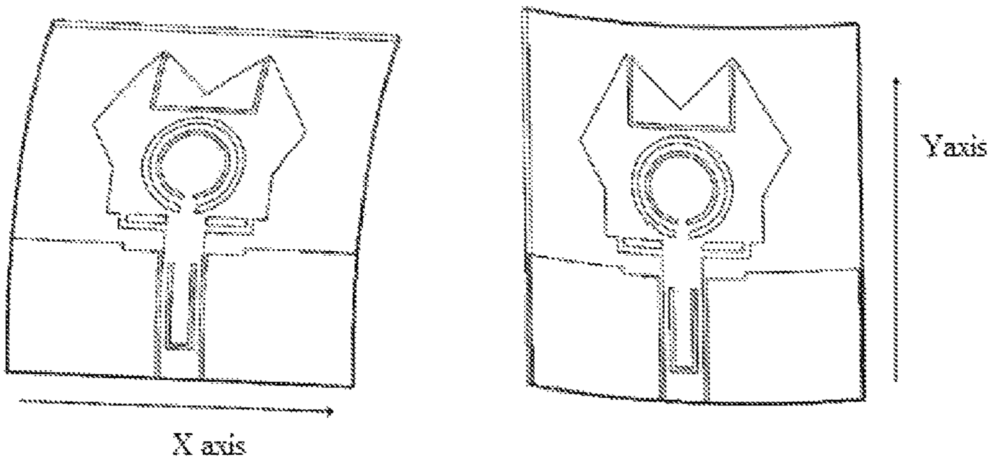
FIG. 8 is a schematic diagram of the bending model of a four-notch flexible wearable ultra-wideband antenna fed by the coplanar waveguide along the X-axis and along the Y-axis of the present application, and similar models are used in Embodiment 1, Embodiment 2, and Embodiment 3.
Figure 9:
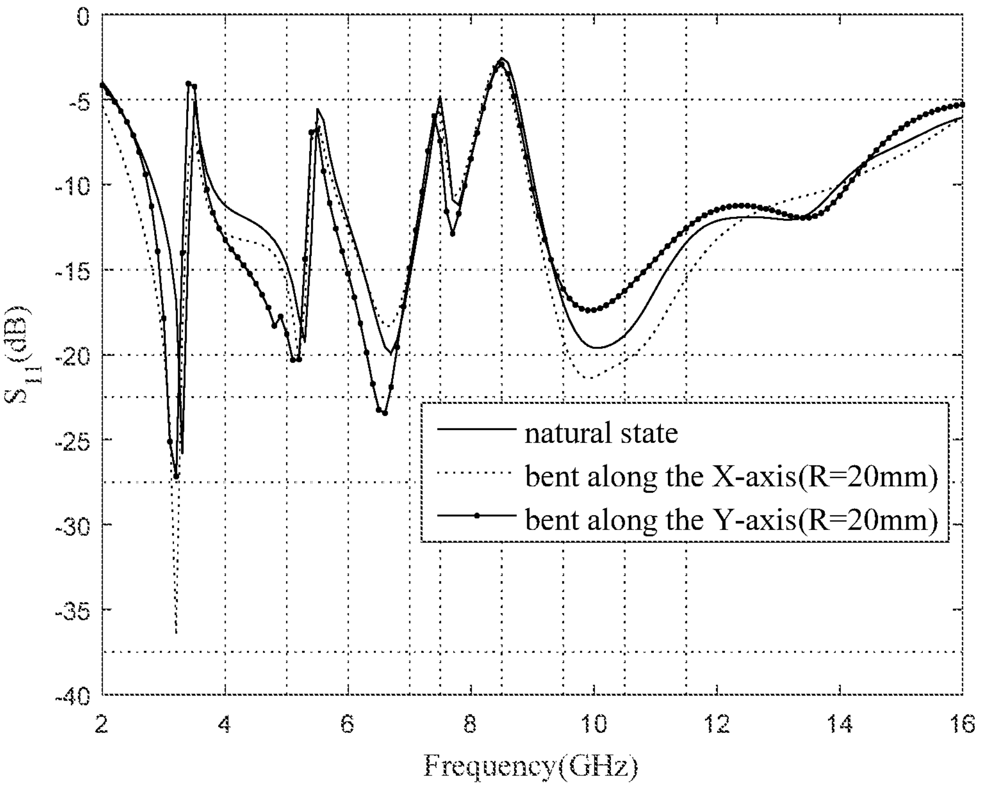
FIG. 9 is the S11 curves of the antenna of the present application with PDMS as the base and conductive silver glue as the conductive medium when it is bent along the X axis, bent along the Y axis and not bent.

In order to verify that the antenna has good conformality, the bending models along the X-axis and the Y-axis are established in HFSS respectively. The schematic diagram is shown in FIG. 8. The bending radius is set to 20 mm. FIG. 9 is the S11 curves of this embodiment when it is bent along the X axis, bent along the Y axis and not bent. It can be seen from the figure that when the antenna is bent, the notch frequency point shifts by about 100 MHz, but the notch function is not affected, and the antenna can still continue to work, indicating that the antenna has good conformality.

Figure 10:
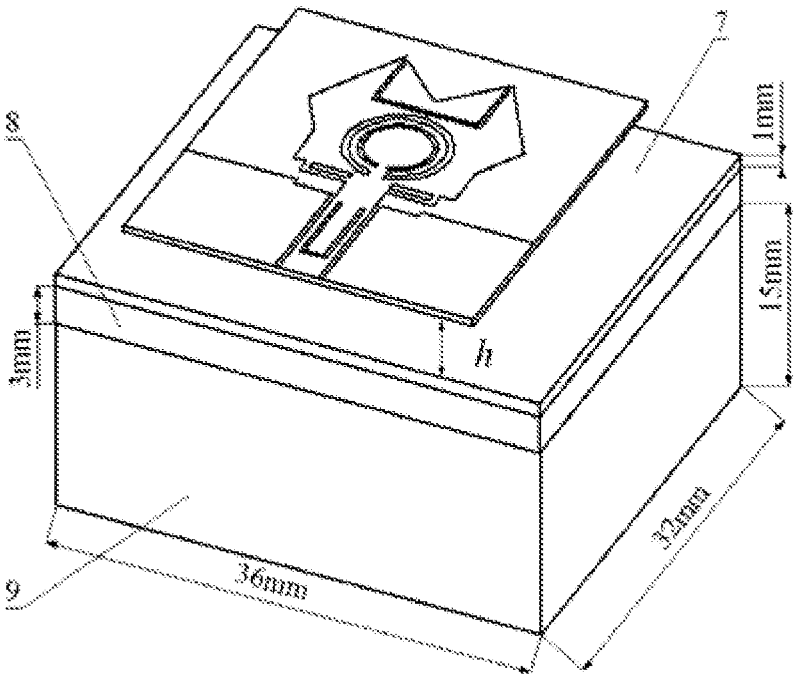
FIG. 10 is a three-layer human tissue model established in HFSS for simulating antenna SAR value, and embodiment 1 and embodiment 2 all adopt this model to simulate SAR value.

In order to verify that the radiation of the antenna meets the requirements during UWB communication, a three-layer human tissue model as shown in FIG. 10 is established in HFSS, including a skin model 7, a fat model 8 and a muscle model 9 that are fitted in sequence from top to bottom. The skin model 7, the fat model 8, and the muscle model 9 are all 32 mm in Y-direction length, 36 mm in X-direction length, 1 mm, 3 mm, and 15 mm in Z-direction thickness, respectively, and h is the distance between the antenna and the model. Since UWB signals are usually at the microwatt level, considering the power surplus, the input power is set to 1 mW, and the simulations are performed at 4 GHz, 7 GHz, and 10 GHz, respectively. Table 1 is the electromagnetic parameters of human tissue at the three frequencies. Table 2 is the simulation result of the maximum average SAR value of the 1 g human tissue model. It can be seen from Table 2 that the antenna working in the UWB communication mode can meet the radiation safety standard of less than 1.6 W/kg formulated by the industry for 1 g organization.

formly stirred in a ratio of 10:1 and injected into the overall mold of the feeder and the radiation patch and the mold of the ground plane. After curing at room temperature or low temperature, the feeder 2, the radiation patch 3 and the ground plane 4 are obtained.

Then adopting the layer-by-layer assembly process, epoxy conductive silver glue (YC-01 type, Nanjing Helite Adhesive Co., Ltd.) is used to bond the feeder, the radiation patch, and the ground plane to the PDMS base respectively. Finally, the SMA (Sub-Miniature-A) connector is bonded to the bottom end of the antenna (the signal end is bonded to the feeder, and the ground end is bonded to the ground plane). After the assembly is completed, the antenna sample of Embodiment 1 is obtained.

In order to reflect the good practicability and universality of the present application, this embodiment provides a second implementation manner. The antenna structure and Embodiment 1 only have the adjustment of the antenna size parameter, and the structure can refer to FIG. 1. Wherein, the radiation patch 3, the feeder 2 and the ground plane 4 are made of conductive silver particles, and the flexible base 1 is made of PET.

The requirements for the performance parameters of the antenna in this embodiment are the same as those in

TABLE 1

Electromagnetic parameters of different tissues of the human body at frequencies of 4 GHz, 7 GHz and 10 GHz

| | Skin | | | Muscle | | | Fat | | |
|---|---|---|---|---|---|---|---|---|---|
| Frequency (GHz) | Relative permittivity | loss tangent | Conductivity (S/m) | Relative permittivity | loss tangent | Conductivity (S/m) | Relative permittivity | loss tangent | Conductivity (S/m) |
| 4 | 36.587 | 0.2875 | 2.340 | 50.821 | 0.2667 | 3.016 | 5.125 | 0.1604 | 0.183 |
| 7 | 34.084 | 0.3630 | 4.818 | 46.865 | 0.3540 | 6.461 | 4.848 | 0.1979 | 0.374 |
| 10 | 31.290 | 0.4604 | 8.014 | 42.764 | 0.4467 | 10.63 | 4.602 | 0.2286 | 0.585 |

TABLE 2

Maximum average SAR values at different distances at 4 GHz, 7 GHz, and 10 GHz (Embodiment 1)

| SAR | h(mm) | | |
|---|---|---|---|
| Frequency (GHz) | 1 | 3 | 5 |
| 4 | 0.150 | 0.090 | 0.056 |
| 7 | 0.258 | 0.156 | 0.079 |
| 10 | 0.249 | 0.102 | 0.046 |

This embodiment utilizes the layer-by-layer assembly process to prepare the antenna, and the process is as follows.

First, the flexible base 1, the feeder 2, the radiation patch 3 and the ground plane 4 are prepared respectively. A 3D printer (MakerBot Replicator 2x, precision 100 μm) was used to prepare the molds of the flexible base 1, the radiation patch 3 and the ground plane 4. Wherein the radiation patch 3 and the feeder 2 are used as a whole to make a mold, and the thickness of the radiation patch 3 and the ground plane 4 is set to 200 μm. The PDMS (Dow Corning Sylgard 184 Silicone Rubber, $\varepsilon_r$=2.65, tan δ=0.02) and curing agent are mixed in a ratio of 10:1, stirred evenly with a magnetic stirrer, and then injected into the base mold, and placed in a vacuum drying box (FDWTC-D type, Shanghai Fudan Tianxin Scientific and Educational Instrument Co., Ltd.) for vacuum treatment, in order to remove air bubbles in PDMS. The silicone conductive silver glue (YC-02 type, Nanjing Xilite Adhesive Co., Ltd.) and the curing agent are uni- Embodiment 1, and modeling and simulation are also carried out with the help of the three-dimensional electromagnetic simulation software Ansoft HFSS. The wave port setting of the coplanar waveband excitation in this embodiment is similar to that in FIG. 1. Since the size of the wave port is related to the thickness of the antenna base, the width of the gap between the feeder and the ground plane, the width of the feeder, etc., the parameters should be adjusted appropriately according to the setting of the HFSS wave port.

Figure 2B:
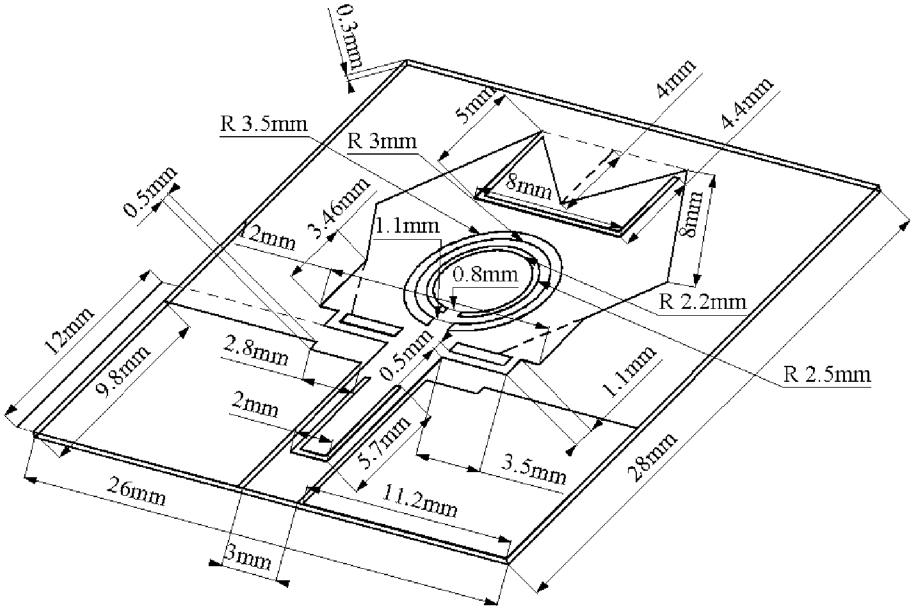
FIG. 2B is a parameter diagram of the size of the antenna of the present application with PET as the base and conductive silver particles as the conductive medium.

After completing the modeling and wave port excitation settings of the four-notch flexible wearable belt antenna fed by the coplanar waveguide in this embodiment, the frequency sweep analysis is performed on the antenna size parameters. The optimized antenna size is shown in FIG. 2B.

The Y-direction length of the flexible base 1 is 28 mm, the X-direction length is 26 mm, and the Z-direction thickness is 0.3 mm.

The Y-direction length of the main feeder 22 is 12 mm, and the X-direction length is 3 mm. The Y-direction length of the branch point 21 from the top of the main feeder is 1.1 mm. The branch feeder 23 is L-shaped, the Y-direction length of the branch feeder 23 is 1.1 mm, the X-direction length is 3 mm, and the width of the branch feeder 23 is 0.5 mm.

The radiation patch 3 is a regular hexagon with a side length of 8 mm. The patch opening 32 is in the shape of an isosceles triangle, the bottom side of which coincides with the top side of the regular hexagon, the height is along the Y direction, and the length is 4 mm. The feeder connection 31 is in the form of a right-angled triangle, and its two right-angled sides are arranged along the Y and X directions respectively, and the lengths are 3.46 mm and 2 mm respectively. The bottoms of the two feeder connections 31 are flush with the bottom side of the regular hexagon, and the hypotenuses of the two feeder connections 31 are respectively set to fit the two sides of the lower part of the regular hexagon.

The ground plane 4 on one side of the feeder 2 has a Y-direction length of 9.8 mm and an X-direction length of 11.2 mm. The X-direction length of the gap between the main feeder 22 and the ground plane 4 is 0.3 mm. The length of the notch 41 is 0.5 mm in the Y direction and 2.8 mm in the X direction.

There are four resonance slots 5 in this embodiment, so the antenna of this embodiment can correspondingly realize four stop-band characteristics. The specific arrangement of the four resonant slots 5 is as follow.

The first resonant tank 5 is arranged on the main feeder 22, in a right-angled U-shape, with an opening at the top. Its Y-direction length is 5.7 mm, its X-direction length is 2 mm, and the tank width is 0.3 mm.

The second and third resonance tanks 5 are located in the middle of the radiation patch 3, and are in the form of two concentric rings with openings, and the openings of the two rings are located on the same side. Wherein, the larger resonance tank 5 has an outer diameter of 3.5 mm, an inner diameter of 3 mm, and an opening length of 1.1 mm, and the smaller resonance tank 5 has an outer diameter of 2.5 mm, an inner diameter of 2.2 mm, and an opening length of 0.8 mm.

The fourth resonant tank 5 is located on the top of the radiating patch 3, in a right-angled U shape, and the opening is located at the top. One of the top ends on both sides is in communication with the air, and the other is not in communication with the air. The Y-direction length of the fourth resonance tank 5 of the side in communication with the air is 5 mm, the Y-direction length of the side not in communication with the air is 4.4 mm, the X-direction length is 8 mm, and the tank width is 0.3 mm.

Figure 3B:
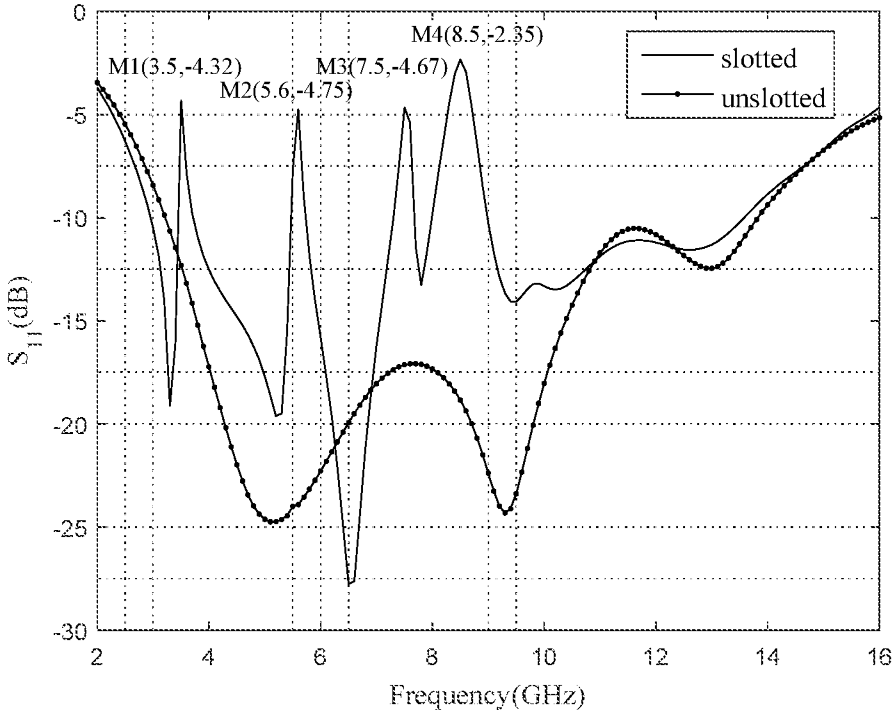
FIG. 3B is the S11 curves of the antenna of the present application with PET as the base and conductive silver particles as the conductive medium when it is unslotted and slotted.
Figure 4B:
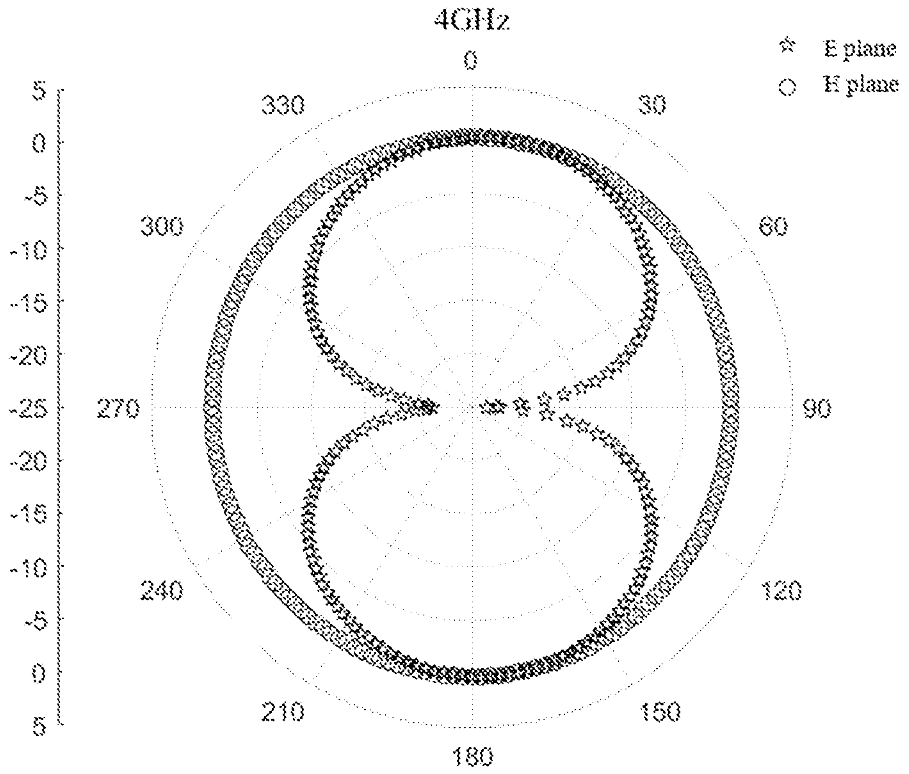
FIG. 4B, FIG. 5B, and FIG. 6B are the patterns of the E and H planes at 4 GHz, 7 GHz, and 10 GHz of the antenna of this application respectively, which uses PET as the base and conductive silver particles as the conductive medium.
Figure 5B:
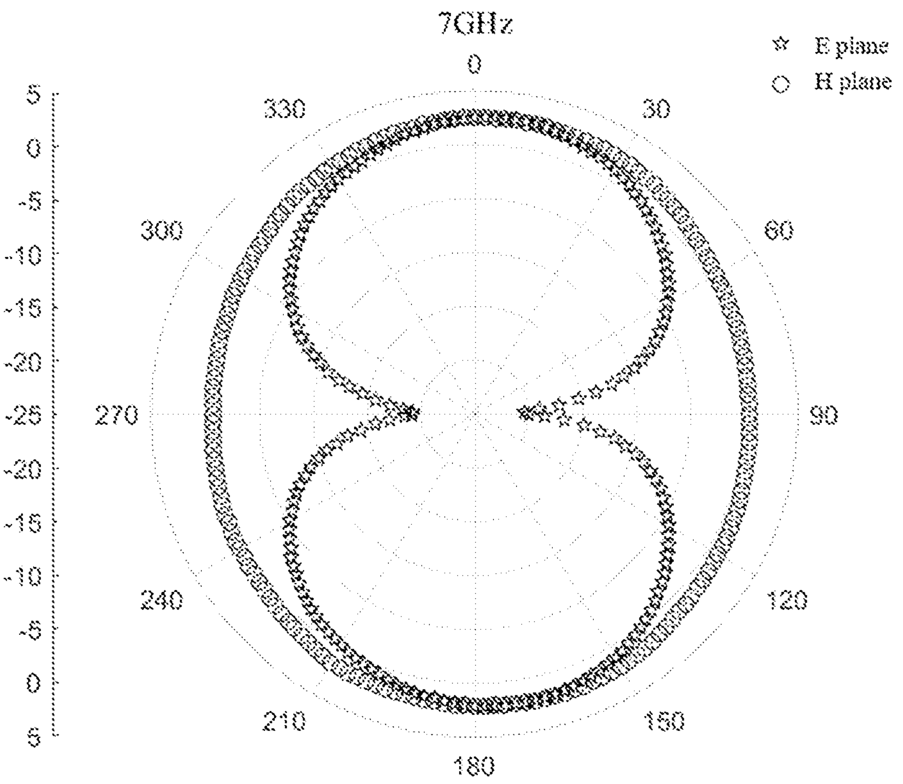
Figure 6B:
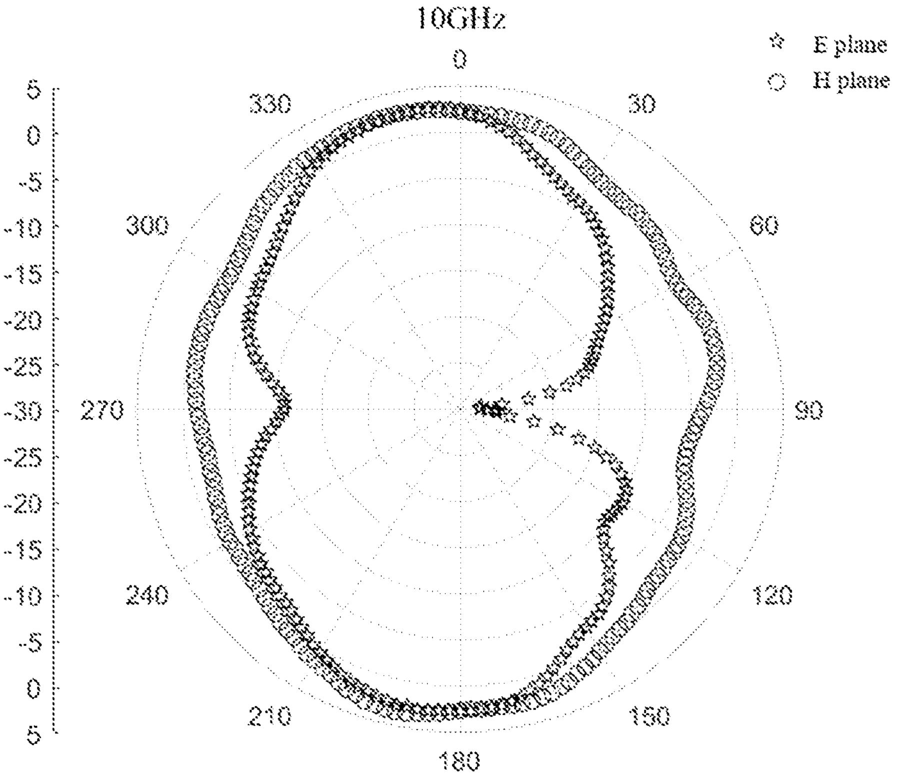

The optimized model is simulated, including slotted and unslotted cases, and its S11 curve is obtained as shown in FIG. 3B. It can be seen from the figure that the S11 parameters of the unslotted UWB antenna are all less than −10 dB at 3-13.8 GHz, the absolute impedance bandwidth of the antenna covers the UWB frequency band, and the relative impedance bandwidth reaches 129%. The slotted antenna has stop-band characteristics at 3.4-3.7 GHz, 5.45-5.75 GHz, 7.3-7.7 GHz, and 8-9 GHz, and realizes the four-notch function. The stop-band resonance points are marked with M1, M2, M3, and M4, respectively. FIG. 4B, FIG. 5B, and FIG. 6B are the gain patterns of the E-plane and H-plane at 4 GHz, 7 GHz, and 10 GHz of this embodiment, respectively. It can be seen from the figure that the H-plane of this embodiment can maintain good omnidirectional radiation in the ultra-wideband frequency band, so it can be practically applied. As shown in FIG. 7, the antenna efficiency of this embodiment is basically above 70%, and the performance is good.

Figure 11:
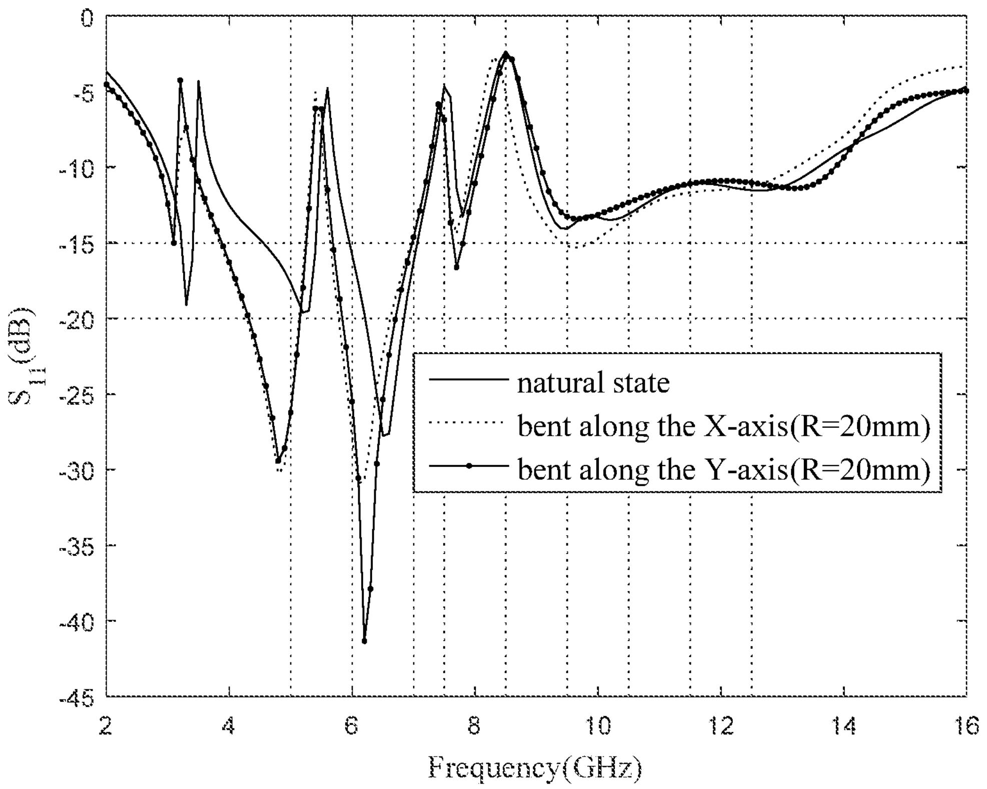
FIG. 11 is the S11 curves of the antenna of the present application with PET as the base and conductive silver particles as the conductive medium when it is bent along the X axis, bent along the Y axis and not bent.

In order to verify that the antenna has good conformality, the bending models along the X-axis and the Y-axis are established in HFSS respectively, similar to Embodiment 1. The schematic diagram is shown in FIG. 8. The bending radius is set to 20 mm. FIG. 11 is the S11 curves of this embodiment when it is bent along the X axis, bent along the Y axis and not bent. It can be seen from the figure that when the antenna is bent, the notch frequency point shifts by about 100 MHz-200 MHz, but the notch function is not affected, and the antenna can still continue to work, indicating that the antenna has good conformality.

In order to verify that the radiation of the antenna meets the requirements during UWB communication, a three-layer human tissue model as shown in FIG. 10 is established in HFSS, similar to Embodiment 1. h is the distance between the antenna and the model. The input power is set to 1 mW, and the electromagnetic parameter settings refer to Table 1. Table 3 shows the simulation results of the maximum average SAR values of the 1 g human tissue model at 4 GHz, 7 GHz, and 10 GHz, respectively. It can be seen from Table 3 that the antenna working in the UWB communication mode can meet the radiation safety standard of less than 1.6 W/kg formulated by the industry for 1 g organization.

TABLE 3

Maximum average SAR values at different distances at 4 GHz, 7 GHZ, and 10 GHz (Embodiment 2)

| SAR | h (mm) | | |
|---|---|---|---|
| Frequency (GHz) | 1 | 3 | 5 |
| 4 | 0.140 | 0.084 | 0.052 |
| 7 | 0.228 | 0.151 | 0.074 |
| 10 | 0.265 | 0.102 | 0.043 |

Different from Embodiment 1, the present embodiment adopts the inkjet printing process to prepare the antenna, and the process is as follows.

The PET flexible base is selected from the American Gale DuPont Ensinger product, and its relative dielectric constant $\varepsilon_r$=4, loss angle tan δ=0.01. First, the PET is cut according to the simulated size, and the surface of the cut PET is cleaned with ultrasonic waves to remove impurities on the surface. Then, surface plasma treatment is performed to improve the roughness of the surface of the PET base, so that the conductive silver ink sprayed later can be firmly attached to the surface of the base.

After the flexible PET base is processed, a radiation patch and ground plane pattern are directly printed on the surface of the PET base by an inkjet printing process. The printer adopts DMP-2831 material jet printer of Fujifilm Dimatix Company. The conductive silver particles are DGP40LT-20C or DGP40LT-15C products of Fujifilm Dimatix Company, and the silver content is 30~35%. Since the effect of pattern formation will be affected by the number of printing layers, the spacing of printing dots, and the sintering temperature, the nozzle step spacing is set to 15 μm according to experience, to obtain a good conductive effect. The number of printing layers is 2~3 layers to obtain a conductive medium with a thickness of about 300 μm. After the pattern printing is completed, the PET flexible base is placed horizontally in a 150° C. incubator for 10 minutes to sinter and cure the silver nanoparticles. After the preparation of the antenna is completed, the SMA interface is bonded with YC-01 epoxy conductive silver glue, and the bonding method is the same as that in Embodiment 1.

In order to illustrate that the present application can be prepared in high yields, this embodiment provides a third implementation. The antenna structure and Embodiment 1. 2 only have the adjustment of the size, and the structure can refer to FIG. 1. Wherein, the radiation patch 3, the feeder 2 and the ground plane 4 are made of copper foil, and the flexible base 1 is made of PI.

The requirements for the performance parameters of the antenna in this embodiment are the same as those in Embodiment 1 and Embodiment 2, and modeling and simulation are also carried out with the help of the three-dimensional electromagnetic simulation software Ansoft HFSS. The wave port size is also adjusted appropriately according to the HFSS wave port settings.

Figure 2C:
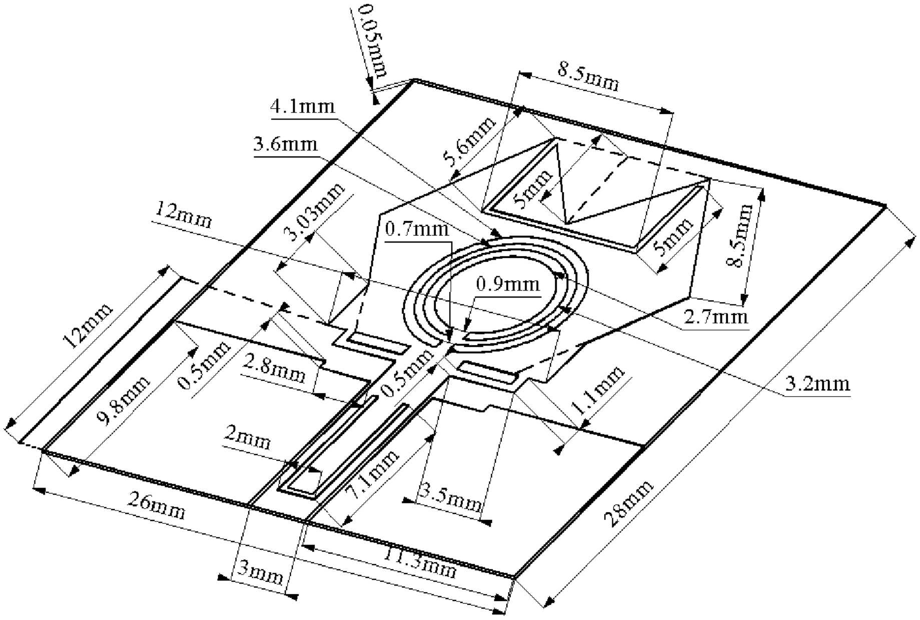
FIG. 2C is a parameter diagram of the size of the antenna in this application with PI as the base and copper foil as the conductive medium.

After completing the modeling and wave port excitation settings of the four-notch flexible wearable belt antenna fed by the coplanar waveguide in this embodiment, the frequency sweep analysis is performed on the antenna size parameters. The optimized antenna size is shown in FIG. 2C.

The Y-direction length of the flexible base 1 is 28 mm, the X-direction length is 26 mm, and the Z-direction thickness is 0.05 mm.

The Y-direction length of the main feeder 22 is 12 mm, and the X-direction length is 3 mm. The Y-direction length of the branch point 21 from the top of the main feeder is 1.1 mm. The branch feeder 23 is L-shaped, the Y-direction length of the branch feeder 23 is 1.1 mm, the X-direction length is 3 mm, and the width of the branch feeder 23 is 0.5 mm.

The radiation patch 3 is a regular hexagon with a side length of 8.5 mm. The patch opening 32 is in the shape of an isosceles triangle, the bottom side of which coincides with the top side of the regular hexagon, the height is along the Y direction, and the length is 5 mm. The feeder connection 31 is in the form of a right-angled triangle, and its two right-angled sides are arranged along the Y and X directions respectively, and the lengths are 3.03 mm and 2 mm respectively. The bottoms of the two feeder connections 31 are flush with the bottom side of the regular hexagon, and the hypotenuses of the two feeder connections 31 are respectively set to fit the two sides of the lower part of the regular hexagon.

The ground plane 4 on one side of the feeder 2 has a Y direction length of 9.8 mm and an X direction length of 11.3 mm. The X-direction length of the gap between the main feeder 22 and the ground plane 4 is 0.2 mm. The length of the notch 41 is 0.5 mm in the Y direction and 2.8 mm in the X direction.

There are four resonance slots 5 in this embodiment, so the antenna of this embodiment can correspondingly realize four stop-band characteristics. The specific arrangement of the four resonant slots 5 is as follow.

The first resonant tank 5 is arranged on the main feeder 22, in a right-angled U-shape, with an opening at the top. Its Y direction length is 7.1 mm, its X direction length is 2 mm, and the tank width is 0.3 mm.

The second and third resonance tanks 5 are located in the middle of the radiation patch 3, and are in the form of two concentric rings with openings, and the openings of the two rings are located on the same side. Wherein, the larger resonance tank 5 has an outer diameter of 4.1 mm, an inner diameter of 3.6 mm, and an opening length of 0.7 mm, and the smaller resonance tank 5 has an outer diameter of 3.2 mm, an inner diameter of 2.7 mm, and an opening length of 0.9 mm.

The fourth resonant tank 5 is located on the top of the radiating patch 3, in a right-angled U shape, and the opening is located at the top. One of the top ends on both sides is in communication with the air, and the other is not in communication with the air. The Y-direction length of the fourth resonance tank 5 of the side in communication with the air is 5.6 mm, the Y-direction length of the side not in communication with the air is 5 mm, the X-direction length is 8.5 mm, and the tank width is 0.3 mm.

Figure 3C:
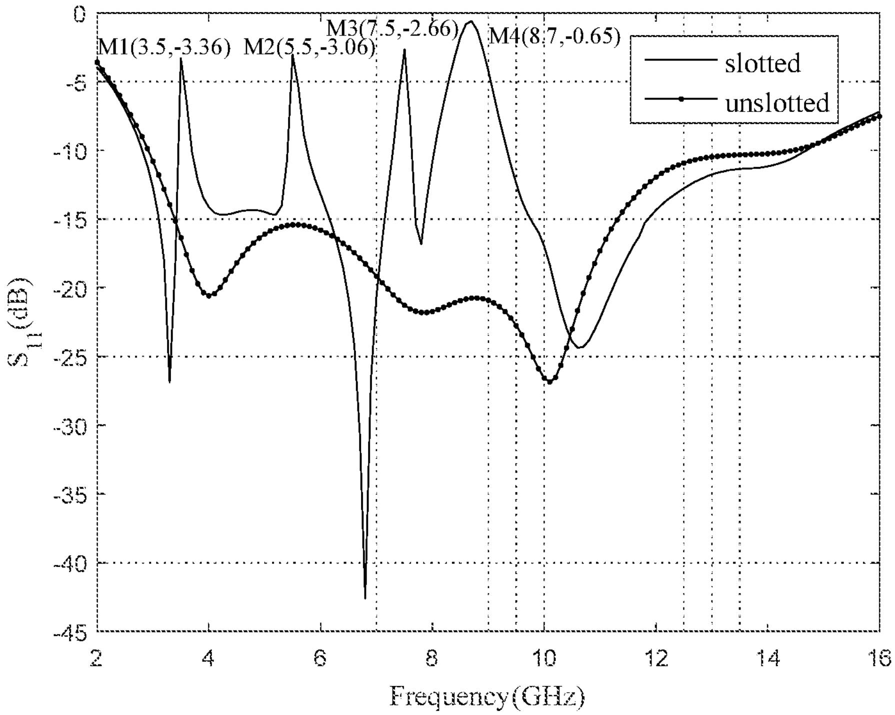
FIG. 3C is the S11 curves of the antenna of the present application with PI as the base and copper foil as the conductive medium when it is unslotted and slotted.
Figure 4C:
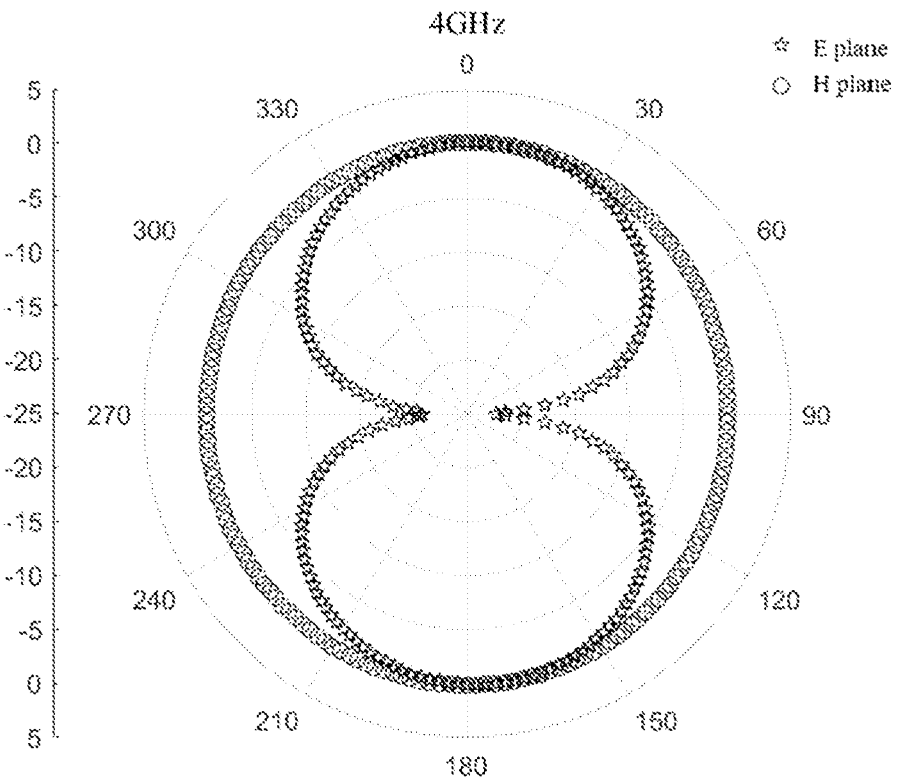
FIG. 4C, FIG. 5C, and FIG. 6C are the patterns of the E and H planes at 4 GHz, 7 GHz, and 10 GHz of the antenna of this application respectively, which uses PI as the base and copper foil as the conductive medium.
Figure 5C:
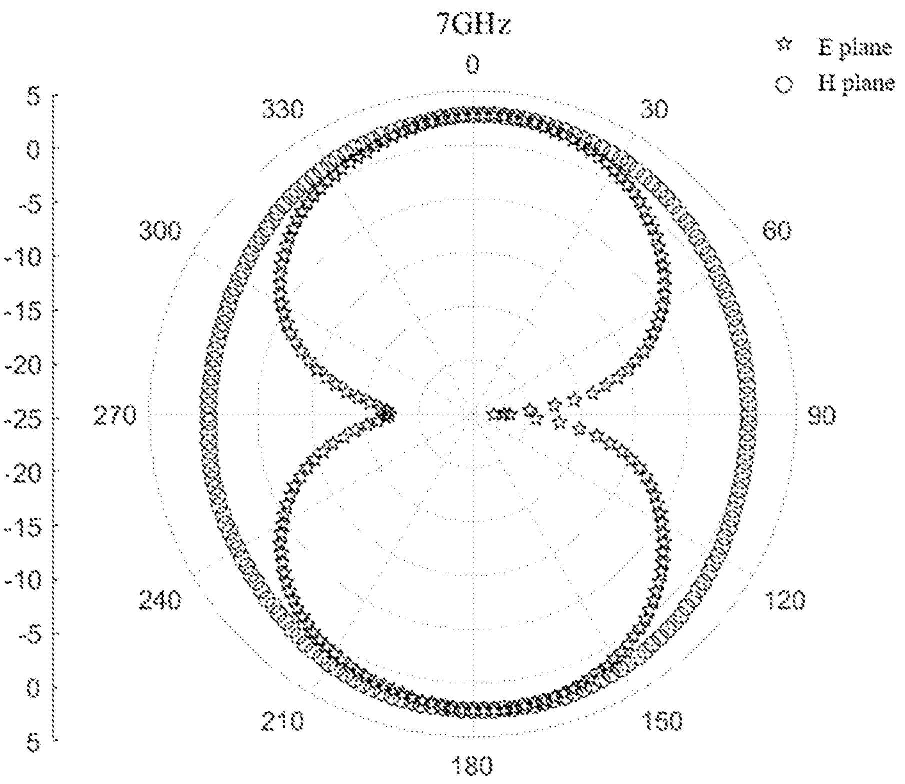
Figure 6C:
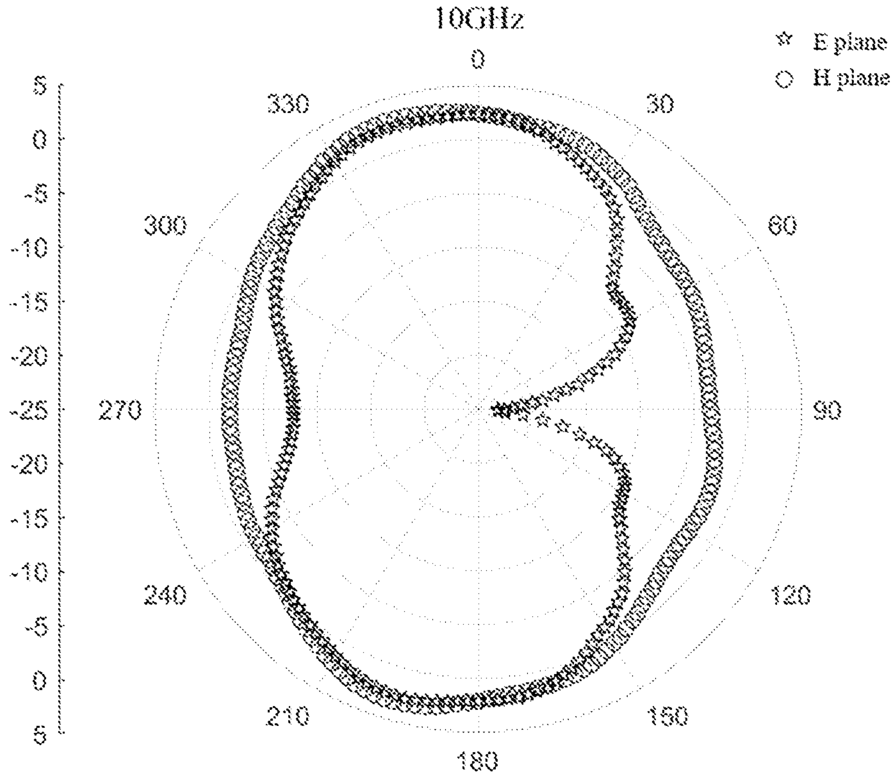

The optimized model is simulated, including slotted and unslotted cases, and its S11 curve is obtained as shown in FIG. 3C. It can be seen from the figure that the S11 parameters of the unslotted UWB antenna are all less than −10 dB at 2.9-14.6 GHz, the absolute impedance bandwidth of the antenna covers the UWB frequency band, and the relative impedance bandwidth reaches 134%. The slotted antenna has stop-band characteristics at 3.4-3.7 GHz, 5.45-5.75 GHz, 7.3-7.7 GHz, and 8-9.3 GHz, and realizes the four-notch function. The stop-band resonance points are marked with M1, M2, M3, and M4, respectively. FIG. 4C, FIG. 5C, and FIG. 6C are the gain patterns of the E-plane and H-plane at 4 GHz, 7 GHz, and 10 GHz of this embodiment, respectively. It can be seen from the figure that the H-plane of this embodiment can maintain good omnidirectional radiation in the ultra-wideband frequency band, so it can be practically applied. As shown in FIG. 7, the antenna efficiency of this embodiment is basically above 80%, and the performance is good.

Figure 12:
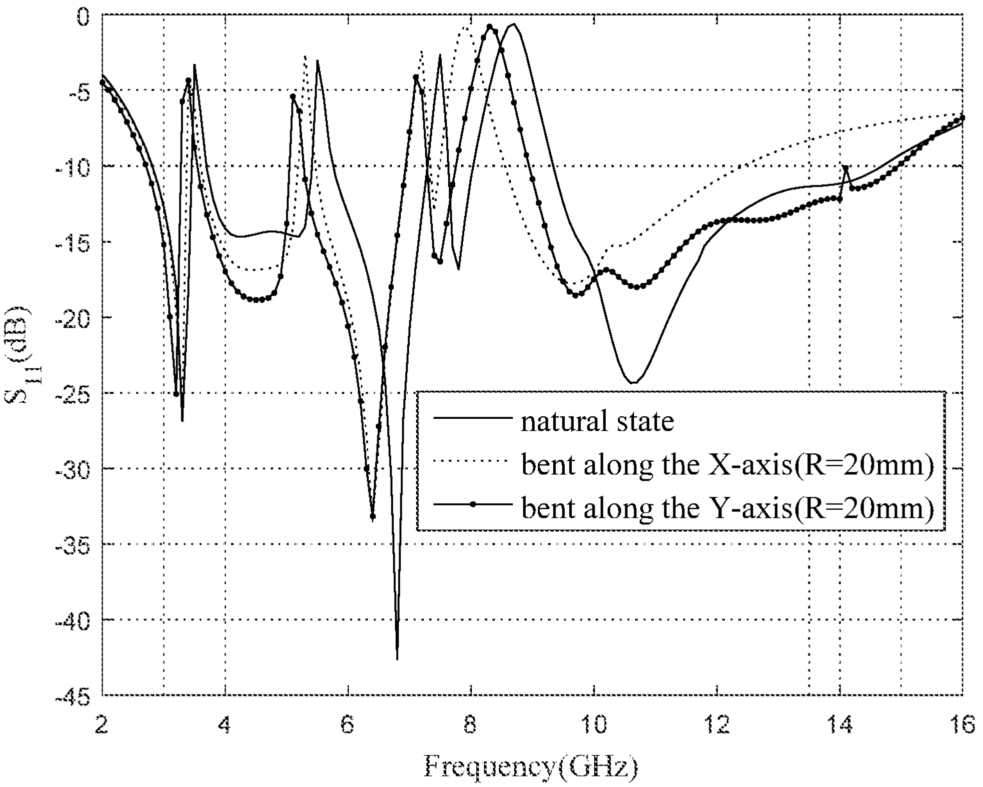
FIG. 12 is the S11 curves of the antenna of the present application with PI as the base and copper foil as the conductive medium when it is bent along the X axis, bent along the Y axis and not bent.

In order to verify that the antenna has good conformality, the bending models along the X-axis and the Y-axis are established in HFSS respectively, similar to Embodiment 1. The schematic diagram is shown in FIG. 8. The X-axis bending radius is set to 80 mm, and the Y-axis bending radius is set to 20 mm. FIG. 12 is the S11 curves of this embodiment when it is bent along the X-axis, bent along the Y-axis and not bent. It can be seen from the figure that when the antenna is bent, the notch frequency point shifts by 200 MHz, but the notch function is not affected. When bending along the X-axis, the notch frequency point has shifted significantly when the bending radius is 80 mm, and the notch function cannot be realized. Therefore, the performance of this embodiment will be affected when the X-axis is bent.

In order to verify that the radiation of the antenna meets the requirements during UWB communication, a three-layer human tissue model as shown in FIG. 10 is established in HFSS, similar to Embodiment 1. h is the distance between the antenna and the model. The input power is set to 1 mW, and the electromagnetic parameter settings refer to Table 1. Table 4 shows the simulation results of the maximum average SAR values of the 1 g human tissue model at 4 GHz, 7 GHz, and 10 GHz, respectively. It can be seen from Table 4 that the antenna working in the UWB communication mode can meet the radiation safety standard of less than 1.6 W/kg formulated by the industry for 1 g organization.

TABLE 4

Maximum average SAR values at different distances at 4 GHZ, 7 GHZ, and 10 GHz (Embodiment 3)

| SAR | h (mm) | | |
|---|---|---|---|
| Frequency (GHz) | 1 | 3 | 5 |
| 4 | 0.150 | 0.080 | 0.056 |
| 7 | 0.224 | 0.179 | 0.090 |
| 10 | 0.270 | 0.097 | 0.045 |

In order to illustrate the practicability of this embodiment, the present embodiment provides the following preparation process:

Since the present application adopts the coplanar waveguide feeding method, it can be prepared by using the common single-panel process flow of FPCB. First, a PI film with a thickness of 0.05 mm ($\varepsilon_r$=3.4, tan δ=0.001) is selected, and the film is cut into the size of a base. Plasma equipment is used to clean the surface of the flexible base, in order to increase the roughness of the surface of the PI film, so that the subsequent copper plating can be firmly attached to the surface of the base.

After the pretreatment of the flexible base is completed, copper is plated on the surface of the flexible base by electrochemical reaction. After copper plating, the oxidized impurities on the copper surface are removed by chemical cleaning and the bonding force of the film is increased. After the cleaning is completed, a dry film is evenly applied on the surface of the copper foil. Using the photosensitive properties of the dry film, the desired antenna pattern is reflected on the copper foil, and then the development operation is carried out, that is, the dry film in the non-photosensitive area is washed away with a certain concentration of sodium carbonate or potassium carbonate solution. Using the corrosion technology to etch away the excess part of the developed board, the semi-finished product of the four-notch flexible wearable ultra-broadband antenna fed by the coplanar waveguide in this embodiment can be obtained. Finally, the dry film remaining on the pattern surface is dissolved with a strong alkali. After the antenna is prepared, a SMA connector is soldered to the bottom end of the antenna (the signal end is welded to the feeder, and the ground end is welded to the ground plane).

As shown in Embodiment 1, Embodiment 2, and Embodiment 3 above, the three embodiments provided in this application can all meet the design requirements of the antenna. By bonding conductive silver glue on a flexible PDMS base, printing conductive silver particles on surface of a PET base, or printing copper foil on surface of a PI base, the antenna obtained in this application has the advantages of full flexibility, strong conformality and strong wearability. At the same time, the antenna structure designed in this application has the four-notch function and ultra-wideband characteristics, and the SAR value meets the radiation standard during UWB communication. As a result, the wearability of the ultra-wideband antenna is realized, which meets the requirements of engineering applications.

The above are only exemplary embodiments of the present application, and are not intended to limit the present application. Any modifications, equivalent replacements and improvements made within the spirit and principles of this application shall be included within the protection scope of this application.

What is claimed is:

1. A four-notch flexible wearable ultra-wideband antenna fed by coplanar waveguide, comprising: a flexible base, wherein a lower part of the upper surface of the flexible base is covered with a ground plane, and an upper part of the upper surface of the flexible base is covered with a radiation patch; a feeder slot is opened in a middle of the ground plane; a feeder comprises a main feeder located in the middle and two branch feeders formed by branching to both sides of the main feeder at a branch point located in the upper part of the main feeder; the feeder is attached to the upper surface of the flexible base; lower and middle parts of the main feeder are located in the feeder slot, and there is a gap between each side of the feeder slot and the ground plane, and the upper part of the main feeder protrudes out of the feeder slot;

a top of the main feeder is connected to a bottom of the radiation patch as a whole; tops of the two branch feeders are connected to the radiation patch as a whole through a feeder connection provided on both sides of the bottom of the radiation patch; a vertical length of the main feeder from the branch point to the top of the main feeder is equal to a vertical length of the branch feeder; a notch is on a top of the ground plane, which corresponds to a position and a shape of the branch feeder;

several resonant tanks are on the feeder and the radiation patch, and a number of the resonant tanks corresponds to a number of stop-band characteristics that the antenna needs to achieve; the flexible base is made of insulating flexible material, and the feeder, the radiation patch and the ground plane are made of conductive flexible material;

wherein the radiation patch is hexagonal, and a triangular patch opening is opened downward at a horizontally arranged top edge position of the hexagon; the feeder connection is correspondingly set as a right triangle.

2. The four-notch flexible wearable ultra-wideband antenna fed by coplanar waveguide according to claim 1, wherein each branch feeder is L-shaped, and each resonant tank is right-angled U-shaped or annular with an opening.

3. The four-notch flexible wearable ultra-wideband antenna fed by coplanar waveguide according to claim 1, wherein the flexible base, the feeder and the ground plane are in a symmetrical structure.

4. The four-notch flexible wearable ultra-wideband antenna fed by coplanar waveguide according to claim 1, wherein the flexible base is made of PDMS, PET or PI, and the feeder, the radiation patch and the ground plane are made of conductive silver glue, conductive silver particles or copper foil.

* * * * *